US010089961B2

(12) United States Patent
Mihara et al.

(10) Patent No.: US 10,089,961 B2
(45) Date of Patent: Oct. 2, 2018

(54) IMAGE DISPLAY DEVICE, THE IMAGE DISPLAY SYSTEM, AND IMAGE DISPLAY METHOD

(71) Applicant: NEC Display Solutions, Ltd., Tokyo (JP)

(72) Inventors: Tomohiro Mihara, Tokyo (JP); Tatsuo Nishimata, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 138 days.

(21) Appl. No.: 15/101,390

(22) PCT Filed: Dec. 5, 2013

(86) PCT No.: PCT/JP2013/082705
§ 371 (c)(1),
(2) Date: Jun. 2, 2016

(87) PCT Pub. No.: WO2015/083269
PCT Pub. Date: Jun. 11, 2015

(65) Prior Publication Data
US 2016/0372081 A1 Dec. 22, 2016

(51) Int. Cl.
G09G 5/00 (2006.01)
G09G 5/12 (2006.01)
(Continued)

(52) U.S. Cl.
CPC ............ G09G 5/12 (2013.01); G06F 3/1446 (2013.01); G09G 3/20 (2013.01); G09G 5/14 (2013.01);
(Continued)

(58) Field of Classification Search
CPC .. G09G 3/20; G09G 5/12; G09G 5/14; G09G 2300/026; G09G 2310/0202; G09G 2310/0216; G06F 3/1446; G06F 3/14
See application file for complete search history.

(56) References Cited

U.S. PATENT DOCUMENTS 6,552,706 B1 * 4/2003 Ikeda .................. G09G 3/3607
345/100
8,462,093 B2 * 6/2013 Kato .................... G09G 3/3614
345/100
(Continued)

FOREIGN PATENT DOCUMENTS

JP S 52-044529 A 4/1977
JP S 60-254186 A 12/1985
(Continued)

OTHER PUBLICATIONS

International Search Report (ISR) (PCT Form PCT/ISA/210), in PCT/JP2013/082705, dated Mar. 4, 2014.

Primary Examiner — Vijay Shankar
(74) Attorney, Agent, or Firm — McGinn I.P. Law Group, PLLC.

(57) ABSTRACT

An image display device having a display panel, the device being utilized to form an image display system in which a plurality of the image display devices are arrayed in one or both of vertical and horizontal directions to display one image as a whole while an image allocated to each device is displayed via the corresponding display panel, the image display device includes a reading processing unit that reads out image information and delays start of output of this image information by a predetermined period of time determined based on the number of the image display devices which forms the image display system and a row to which the present device belongs in the vertical arrangement.

15 Claims, 10 Drawing Sheets

(51) Int. Cl.
  *G09G 3/20* (2006.01)
  *G06F 3/14* (2006.01)
  *G09G 5/14* (2006.01)

(52) U.S. Cl.
  CPC ............... *G09G 2300/026* (2013.01); *G09G 2310/0202* (2013.01); *G09G 2310/0216* (2013.01)

(56) References Cited

U.S. PATENT DOCUMENTS

| | | | | |
|---|---|---|---|---|
| 8,633,884 | B2* | 1/2014 | Baek | G09G 3/3614 |
| | | | | 345/209 |
| 8,749,825 | B2* | 6/2014 | Toyoda | G06F 3/1207 |
| | | | | 358/1.1 |
| 9,495,923 | B2* | 11/2016 | Shiomi | G09G 3/2074 |
| 2002/0075219 | A1* | 6/2002 | Morita | G09G 3/3648 |
| | | | | 345/92 |
| 2008/0284695 | A1* | 11/2008 | Kato | G09G 3/3614 |
| | | | | 345/87 |
| 2012/0243037 | A1* | 9/2012 | Toyoda | G06F 3/1207 |
| | | | | 358/1.15 |
| 2014/0085279 | A1* | 3/2014 | Shiomi | G09G 3/2074 |
| | | | | 345/204 |
| 2016/0133224 | A1* | 5/2016 | Nakajima | G06F 3/1446 |
| | | | | 348/445 |

FOREIGN PATENT DOCUMENTS

| | | |
|---|---|---|
| JP | H 02-013076 A | 1/1990 |
| JP | H 03-114374 A | 5/1991 |
| JP | H 03-132789 A | 6/1991 |
| JP | H 04-349492 A | 12/1992 |
| JP | H 05-204345 A | 8/1993 |
| JP | H 09-298706 A | 11/1997 |
| JP | H 10-271435 A | 10/1998 |
| JP | 2001-222269 A | 8/2001 |
| JP | 2011-048238 A | 3/2011 |
| WO | WO 2012/157651 A1 | 11/2012 |

* cited by examiner

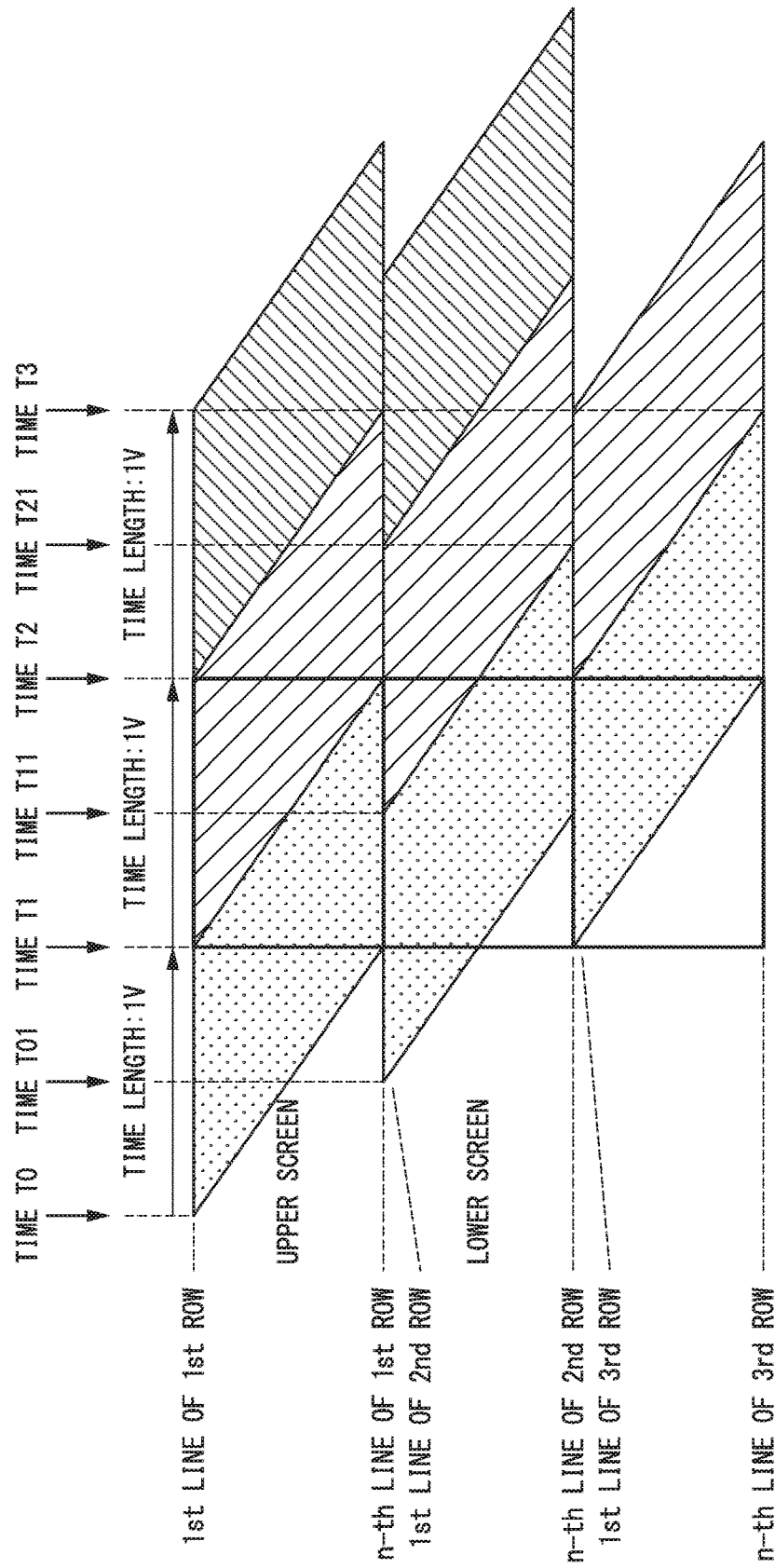

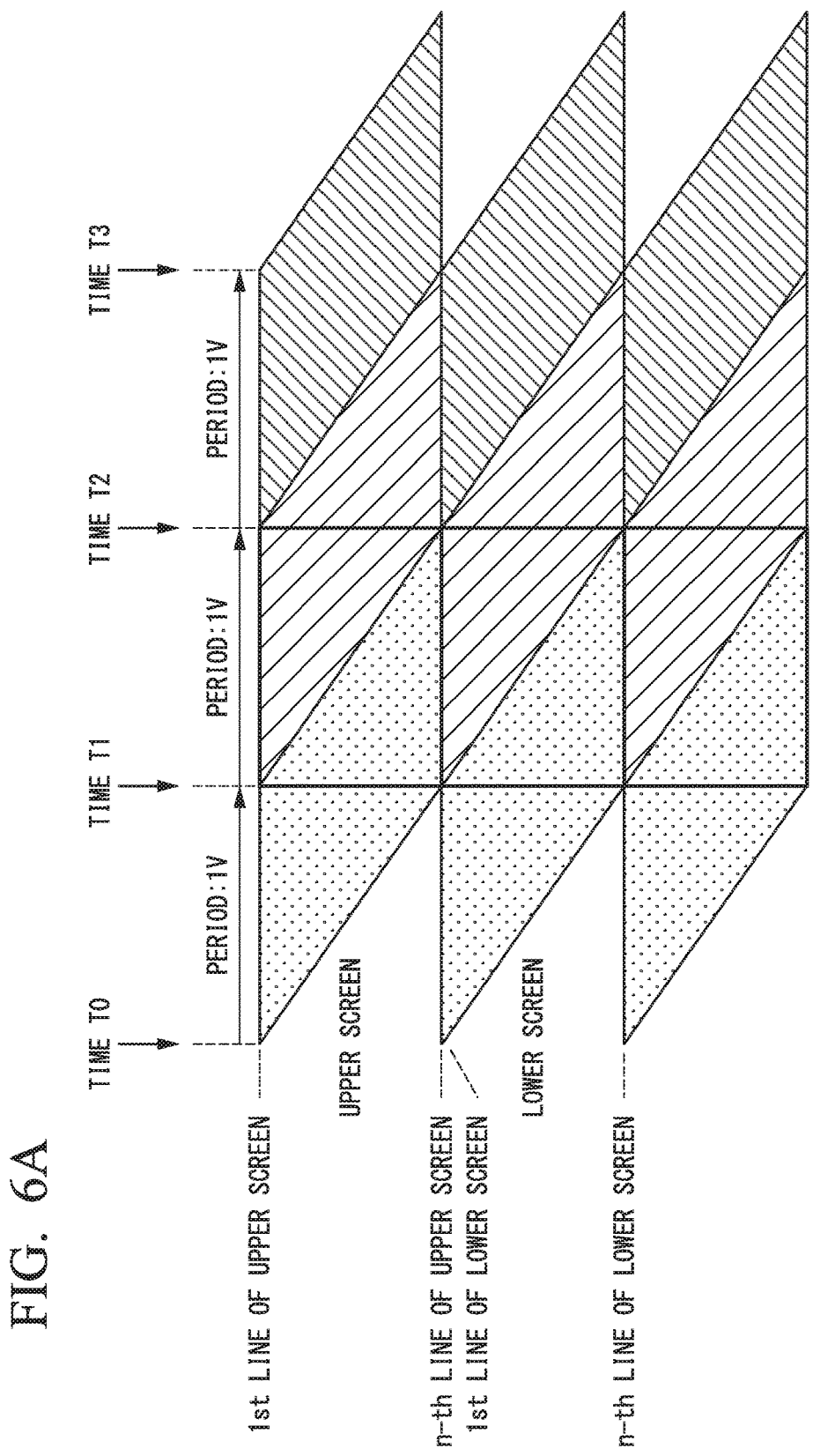

IMAGE DISPLAY DEVICE, THE IMAGE DISPLAY SYSTEM, AND IMAGE DISPLAY METHOD

TECHNICAL FIELD

The present invention relates to an image display device, an image display system, and an image display method, which are utilized for multi-display technology.

BACKGROUND ART

An example of electronic advertisement bulletin boards provided on buildings or the like utilizes a (multi-display or multi-monitor) technique in which a plurality of display panels (i.e., displays) are arrayed in one or both of the vertical and horizontal directions so as to display one image (as a whole) on the whole of the displays and thus implement a large screen.

In an image display system utilizing the above multi-display technique, the whole of the individual display panels display one image. Therefore, when each display panel employs an ordinary display device, a display shift of one frame may be produced between upper and lower (adjacent) display panels. More specifically, each display panel displays an image by scanning each frame in the horizontal direction while simultaneously scanning the frame in the vertical direction. For example, it is assumed that each display panel has n lines (horizontal lines). In this case, the display panel performs the relevant drawing process from the first line (the top of the display panel) to the last n-th line (the bottom of the display panel) to complete the display of the target image. In order to display a video, based on image information items input at every moment, the display panel repeats the above scanning process in the horizontal and vertical directions, for each of different images.

FIG. 6A is a diagram utilized to explain a display shift produced in an image display system related to an embodiment of the present invention. FIG. 6B is a diagram utilized to show an example of displayed images in individual frames.

In FIG. 6A, time is shown along the horizontal axis and the vertical axis corresponds to the vertical direction of each display panel, by which transition in the display image in each display panel is shown. FIG. 6B shows display images of (N−1)th, N-th, and (N+1)th frames.

In the following case, in an image display system utilizing a multi-display in which display panels are arrayed in one or both of the vertical and horizontal directions, the scanning in the vertical direction is synchronously performed between all display panels. In this case, at the moment next to the completion (at time T1) of the drawing of the n-th line where the (N−1)th image is displayed on the entire screen, the individual display panels simultaneously start the drawing of the first line of a different image (i.e., image N) (see FIG. 6A). Then, of any two vertically adjacent display panels, the upper display panel still displays the n-th line of the (N−1)th image while the first line of the lower display panel already displays the N-th image. In the image display system using a multi-display, ideally, all display panels display the same image. However, in the above-described display device, a display shift of one frame is always produced at the boundary between the upper and lower adjacent display panels.

Patent Document 1 displays a technique in which of any two vertically adjacent display panels, the start time of the vertical scanning of the lower display panel is delayed by one frame. According to this technique, it is possible to cancel a display shift of one frame produced at the boundary between the upper and lower adjacent display panels.

PRIOR ART DOCUMENT

Patent Document

Patent Document 1: Japanese Unexamined Patent Application, First Publication No. 2001-222269.

DISCLOSURE OF INVENTION

Problem to be Solved by the Invention

FIG. 7A is a diagram utilized to explain display shift correction means in an image display system related to an embodiment of the present invention. FIG. 7B is a diagram utilized to show an example of displayed images in individual frames.

Similar to FIGS. 6A and 6B, FIGS. 7A and 7B respectively show the transition in the display image in each display panel and the display images of (N−1)th, N-th, and (N+1)th frames. As described above, in the image display system described in Patent Document 1, the start time of the vertical scanning of the lower display panel is delayed by one frame. Accordingly, as shown in FIG. 7A, the same image is always displayed at the boundary between the upper and lower display panels.

According to the means of Patent Document 1, an image display system consists of only two upper and lower panels can be handled by producing only one-frame delay. However, in an image display system consists of three or more display panels arranged vertically, time required to the completion of the drawing is delayed by the number of frames corresponding to the number of the vertically arranged display panels (see FIG. 7A). In this case, the time from the start to the completion of the drawing of one image (as a whole) over all of the display panels increases. Accordingly, if a sudden screen switching or the like occurs, then visually, the switching of the image displayed at the lower side is delayed.

The present invention provides an image display device, an image display system, and an image display method.

Means for Solving the Problem

As a first mode of the present invention, an image display device has a display panel, the device being utilized to form an image display system in which a plurality of the image display devices are arrayed in one or both of vertical and horizontal directions to display one image as a whole while an image allocated to each device is displayed via the corresponding display panel. The image display device includes:

a reading processing unit that reads out image information and delays start of output of this image information by a predetermined period of time determined based on the number of the image display devices which forms the image display system and a row to which the present device belongs in the vertical arrangement.

As a second mode of the present invention, an image display system, in which a plurality of the image display devices are arrayed in one or both of vertical and horizontal directions to display one image as a whole while an image allocated to each device is displayed via the corresponding display panel, includes:

each of the image display devices has a reading processing unit that reads out image information and delays start of output of this image information by a predetermined period of time determined based on the number of the image display devices and a row to which the present device belongs in the vertical arrangement.

As a third mode of the present invention, in an image display method in which a plurality of the image display devices are arrayed in one or both of vertical and horizontal directions to display one image as a whole while an image allocated to each device is displayed via the corresponding display panel:

a reading processing unit provided in each of the image display devices reads out image information and delays start of output of this image information by a predetermined period of time determined based on the number of the image display devices and a row to which the present device belongs in the vertical arrangement.

Effect of the Invention

According to the above-described image display device, the image display system, and the image display method, no considerable delay is generated in the operation of displaying one image, and it is possible to reduce a display shift produced at the boundary between the display panels.

BRIEF DESCRIPTION OF THE DRAWINGS

FIG. 4A is a first diagram utilized to explain an effect based on the operation of the image information processing device according to an embodiment of the present invention.

FIG. 6A is a diagram utilized to explain a display shift produced in an image display system related to the present invention.

MODE FOR CARRYING OUT THE INVENTION

Below, an embodiment of the present invention will be explained with reference to the drawings.

Figure 1:
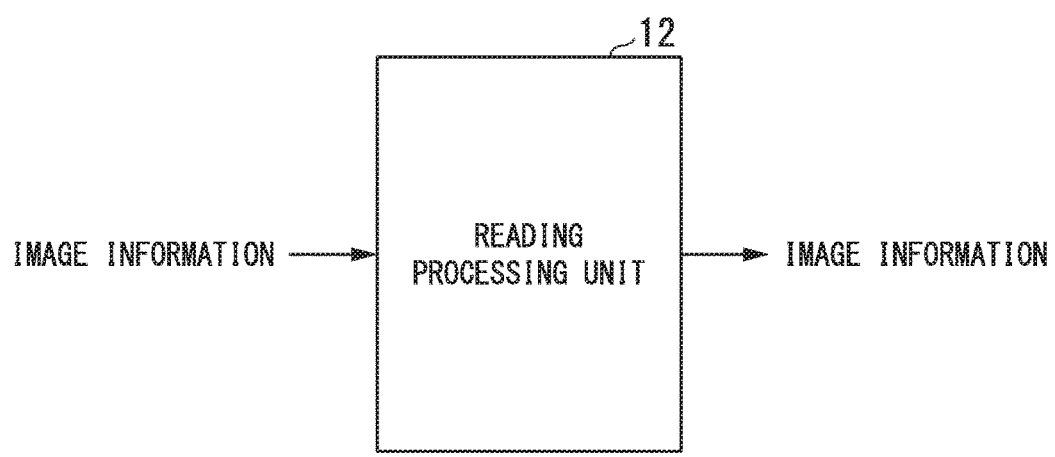
FIG. 1 is a diagram showing a functional configuration of an image information processing device according to an embodiment of the present invention.

FIG. 1 is a diagram showing a functional configuration of an image information processing device according to an embodiment of the present invention.

An image information processing device 1 pertaining to the present embodiment has a writing processing unit 10, an image information storage unit 11, and a reading processing unit 12.

Figure 2:
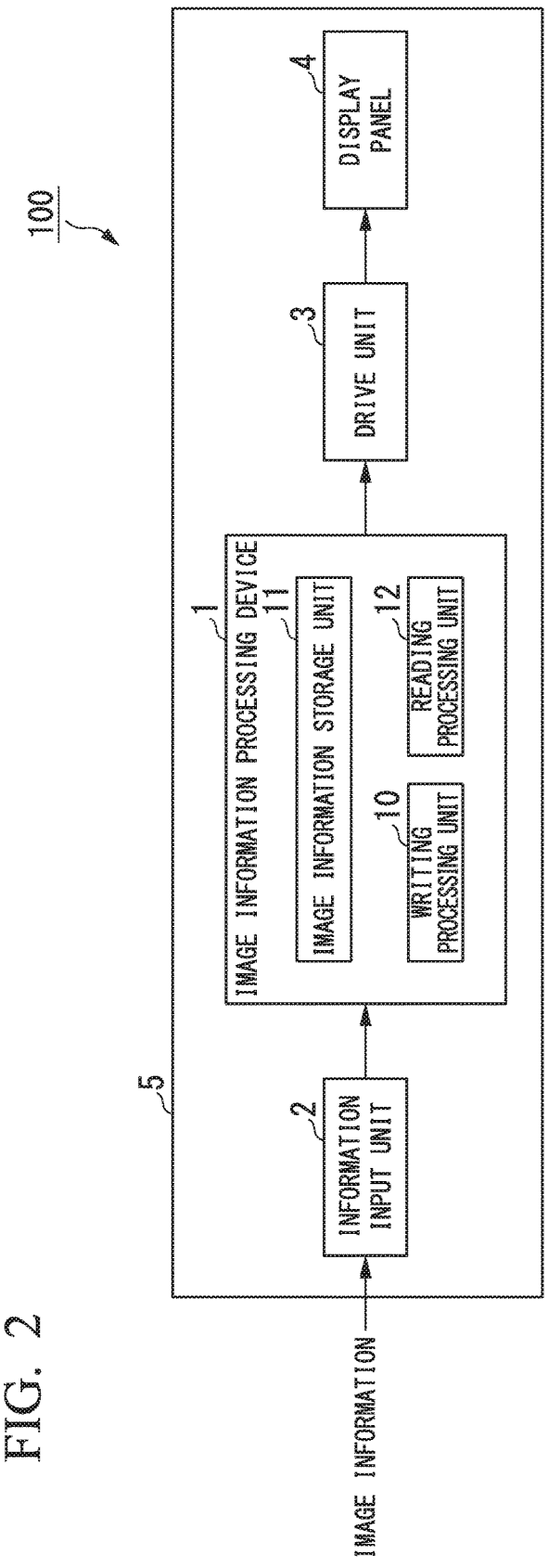
FIG. 2 is a diagram showing a functional configuration of an image display system according to an embodiment of the present invention.

FIG. 2 is a diagram showing a functional configuration of an image display system according to an embodiment of the present invention.

As shown in FIG. 2, an image display system 100 has a plurality of image display devices 5, each including the image information processing device 1, an information input unit 2, a drive unit 3, and a display panel 4. Here, although FIG. 2 shows only one image display device 5, the image display system 100 actually includes the plurality of the image display devices 5.

The image display devices 5, each including the image information processing device 1, the information input unit 2, the drive unit 3, and the display panel 4, display images allocated to the individual image display devices 5 via the display panels 4 provided therein. Such image display devices 5 are arrayed in one or both of the vertical and horizontal directions so as to form the image display system 100 which displays one image as a whole.

Here, the image information processing device 1 stores information, in advance in a storage unit (not shown), about a position to which the image display device 5 provided with this image information processing device 1 belongs. For example, when the image display system 100 is formed by arranging three image display devices 5 both in the vertical and horizontal directions, the image information processing device 1 stores arrangement information of the image display devices 5 (it may be represented by X and Y coordinates, where X and Y each have a value of 1 to 3).

Based on the arrangement information, the image information processing device 1 applies a predetermined process to image information input to the corresponding image display device 5 and outputs the image information (to which the predetermined process has been applied) to the display panel 4 of the relevant image display device 5.

In the explanation below, the above condition such that the image display system 100 is formed by arranging three image display devices 5 both in the vertical and horizontal directions is employed. However, the present embodiment is not limited to such an arrangement.

Next, each functional unit will be explained.

The writing processing unit 10 is a functional unit to receive image information from an external device at every moment and store received individual information items serially in the image information storage unit 11. For example, the writing processing unit 10 generates a writing clock signal obtained by multiplying a horizontal synchronizing signal to have an integral multiple thereof, where the horizontal synchronizing signal is input together with the image information. Although this generation process of the writing clock signal performed in the writing processing unit 10 is performed spontaneously by the writing processing unit 10, it may be performed in accordance with an instruction from a control unit (not shown) provided separately in the image information processing device 1. In addition, the above image information is image information utilized to display a complete (one) image as a whole by the entire image display system 100. Therefore, the image information is input, in common, into each of the image information processing devices 1 which belongs to the corresponding image display device 5.

The image information storage unit 11 has an area utilized to temporarily store the image information input into the writing processing unit 10. The image information storage unit 11 is characterized by having an memory area capable of storing image information of one frame and also image information of at least one line. This image information storage unit 11 is generally a storage device called a "video memory".

Based on a predetermined vertical synchronizing signal, the reading processing unit 12 is a functional unit which outputs partial image information allocated to the own device (i.e., the present image display device 5 of this reading processing unit 12) in the image information stored in the image information storage unit 11, to the display panel 4 at every moment. That is, the reading processing unit 12 reads out the partial image information, which is a region allocated to the own device (the image display device 5) in the image information stored in the image information storage unit 11, and outputs the read information to the display panel 4. In this process, the reading processing unit 12 refers to the arrangement information which is stored by the image information processing device 1 in advance. For example, in case of the image information processing device 1 of the image display device 5 located at the upper left corner of the image display system 100 (the location may be represented by "X =1 and Y=1"), the reading processing unit 12 reads out, in the image information stored in the image information storage unit 11, (information of) a region corresponding to the upper left ⅓ of an image to be displayed based on the relevant image information. Furthermore, the reading processing unit 12 outputs the relevant image information by processing the above upper left ⅓ region so as to be displayed as a triple-enlarged image on the display panel 4. Such a process is performed by the image information processing device 1 of each of the image display devices 5 and thus one enlarged image is displayed by the nine image display devices 5 in the image display system 100.

The information input unit 2 is a functional unit utilized to receive the image information input from an external device, which may be a video recorder, a video playback device, or the like. If the input image information is an analog signal, the information input unit 2 may be provided with an A/D converter.

The drive unit 3 is a functional unit utilized to perform an electric process of actually displaying a predetermined image on the display panel 4 based on an electrical signal of the image information input from the image information processing device 1. For a typical TFT (Thin Film Transistor) liquid crystal panel, such a functional unit is an electric circuit element called a "gate driver", a "source driver", or the like.

The display panel 4 is a functional unit utilized to display, according to the above electric process of the drive unit 3 based on the image information, an image based on the relevant image information in a manner visible to users. More specifically, the display panel 4 may be a liquid crystal display panel, an organic EL display panel, a plasma display panel, or the like. In addition, the image display system 100 implements a large screen by arraying a plurality of the image display devices 5, each including the display panel 4, in one or both of the vertical and horizontal directions.

Figure 3:
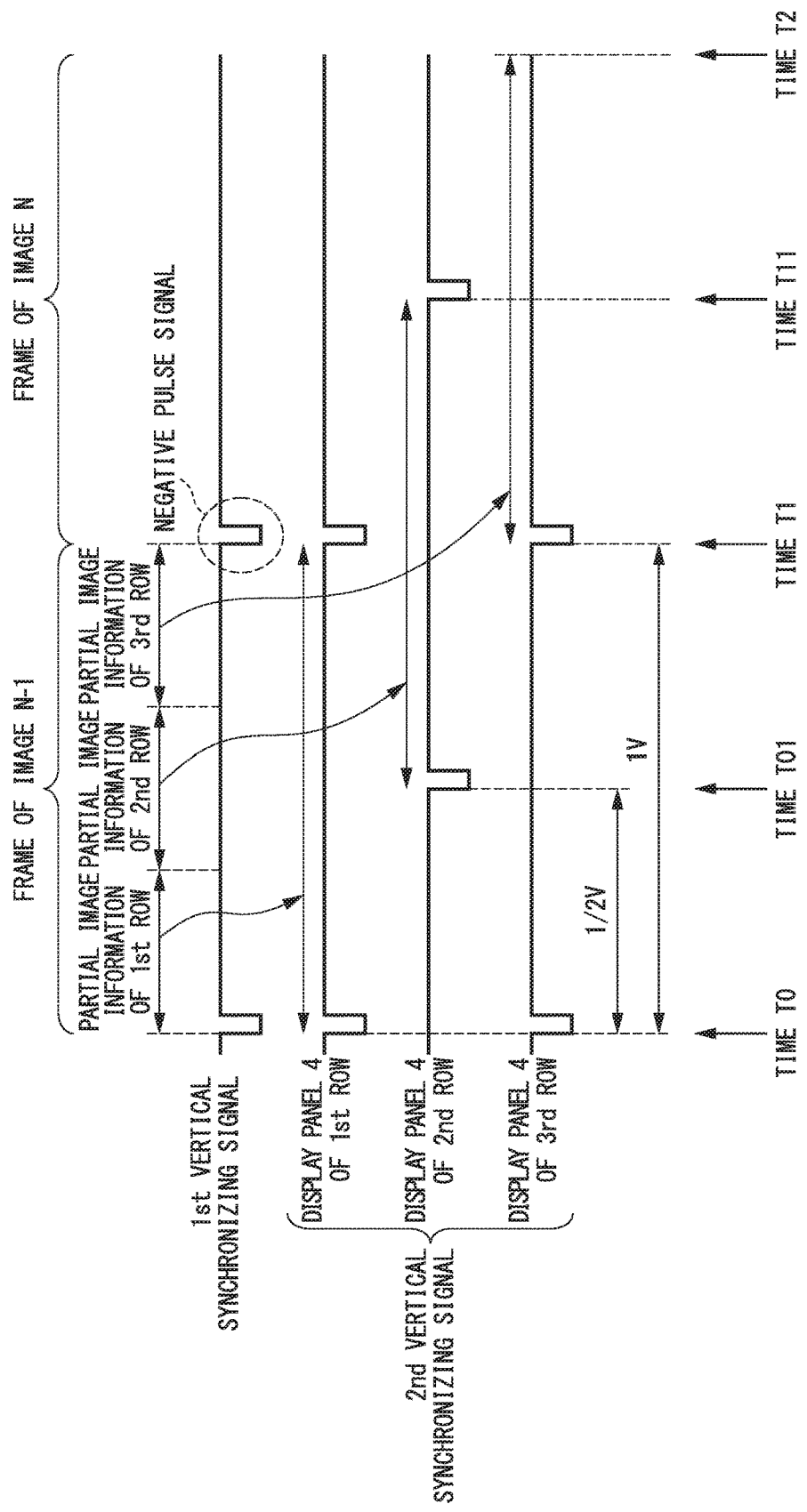
FIG. 3 is a diagram showing a timing chart of the vertical synchronizing signal generated by the reading processing unit according to an embodiment of the present invention.

FIG. 3 is a diagram showing a timing chart of the vertical synchronizing signal generated by the reading processing unit according to an embodiment of the present invention.

Here, a specific process performed by the reading processing unit 12 according to the present embodiment will be described with reference to FIG. 3. First, the reading processing unit 12 receives a first vertical synchronizing signal. The first vertical synchronizing signal is a common signal input into each of the image information processing devices 1, and a reference signal utilized by the display panels 4 to display one image as a whole. As shown in FIG. 3, the first vertical synchronizing signal is a signal that outputs a negative pulse signal for each frame. Based on the timing decided by the negative pulses, the reading processing unit 12 starts the output of the image information.

At the pulse intervals of the first vertical synchronizing signal, the writing processing unit 10 writes the image information of one image in the image information storage unit 11 sequentially.

In the present embodiment, "frame" is a unit of the image information, utilized to display one image (from the first line to the n-th line thereof) by one display panel.

The reading processing unit 12 in the present embodiment is characterized by delaying the start of the signal output to the display panel 4 by a predetermined period of time determined based on the number (N) of the image display devices 5 arranged vertically. Below, a specific processing thereof will be explained.

First, when the reading processing unit 12 receives the first vertical synchronizing signal, the reading processing unit 12 refers to the position (X and Y) of the display panel 4 of the present device and the vertical arrangement number N which denotes the number of the image display devices 5 arranged vertically in the image display system 100. Here, the image information processing device 1 of each of the image display devices 5 which form the image display system 100 stores the vertical arrangement number N in a predetermined storage unit (not shown) in advance. Since the image display system 100 explained in the present embodiment is a system in which three image display devices 5 are arrayed in each of the vertical and horizontal directions, the vertical arrangement number N is 3.

The reading processing unit 12 also delays the start of the signal output to the display panel 4 by a predetermined period of time determined based on the row (i-th row), in the vertical arrangement (number N), to which (the i-th row) the own device (the image display device 5) belongs. In the following explanation, among the image display devices 5 which form the image display system 100 in the present embodiment, the image display devices 5 which belong to the top row are represented as belonging to "the first row", the image display devices 5 which belong to the middle row are represented as belonging to "the second row", and the image display devices 5 which belong to the bottom row are represented as belonging to "the third row".

First, the reading processing unit 12 refers to the vertical arrangement number N and the coordinate information of its own device (the image display device 5) to determine which row the own device belongs to. After the reading processing unit 12 identifies the vertical arrangement number (N) and the row (i) to which the relevant display panel 4 belongs, a delay amount Td is computed based on the following formula. Here, "V" in Formula (1) is a unit time length required to display an image per unit frame on one display panel 4 (i.e., "1V" equals a time length required to display an image of one frame).

[Formula 1]

$$Td = \frac{i-1}{N-1}V \quad (1)$$

According to Formula (1), the reading processing unit 12 computes second vertical synchronizing signals as explained below. Since the delay amount Td is 0 when the own device (the image display device 5) belongs to the first row, the corresponding reading processing unit 12 directly uses the received first vertical synchronizing signal as the second vertical synchronizing signal without performing any process for the first vertical synchronizing signal (see FIG. 3). Since the delay amount Td is ½V (i.e., (½)V) when the own device belongs to the second row, the corresponding reading processing unit 12 applies a delay shift of ½V to the first vertical synchronizing signal and uses the delayed signal as the second vertical synchronizing signal (see FIG. 3). Additionally, since the delay amount Td is 1V when the own device belongs to the third row, the corresponding reading processing unit 12 applies a delay shift of 1V to the first vertical synchronizing signal and uses the delayed signal as the second vertical synchronizing signal (see FIG. 3).

Figure 4B:
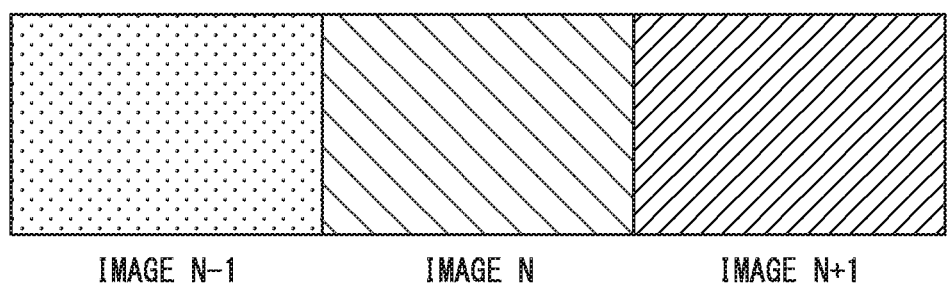
FIG. 4B is a diagram utilized to show an example of displayed images in individual frames.

The reading processing units 12 of the image display devices 5 arranged in the first row each read out partial image information (for the first row) allocated to each device from the image information storage unit 11 and outputs the relevant partial image information from time T0 to time T1 (i.e., after 1V), by performing no delay operation. In this process, the reading processing unit 12 displays an image based on the partial image information in a triple-enlarged manner The reading processing units 12 of the image display devices 5 arranged in the second row each read out partial image information (for the second row) allocated to each device from the image information storage unit 11 and outputs the relevant partial image information from time T01 to time T11 (i.e., after 1V), by applying a delay of ½V to time T0. In this process, the reading processing unit 12 also displays an image based on the partial image information in a triple-enlarged manner Similarly, the reading processing units 12 of the image display devices 5 arranged in the third row each read out partial image information (for the third row) allocated to each device from the image information storage unit 11 and outputs the relevant partial image information from time T1 to time T2 (i.e., after 1V), by applying a delay of 1V to time T0. In this process, the reading processing unit 12 also displays an image based on the partial image information in a triple-enlarged manner FIG. 4A is a first diagram utilized to explain an effect based on the operation of the image information processing device according to an embodiment of the present invention. FIG. 4B is a diagram utilized to show an example of displayed images in individual frames.

Similar to FIGS. 6A and 6B or FIGS. 7A and 7B, FIGS. 4A and 4B respectively show a transition in the image displayed in the image display devices 5 and display images of (N−1)th, N-th, and (N+1)th frames. For example, FIG. 4A shows that the first line of each display panel in the first row starts display of image N−1 (i.e., the (N−1)th image) from time T0 and the displayed image is switched to image N at time T1. FIG. 4A also shows that the n-th line of the display panel 4 of each image display device 5 in the first row starts display of image N−1 from time T1 and the displayed image is switched to image N at time T2.

In addition, as shown in FIG. 4A, the first line of the display panel 4 of each image display device 5 in the second row starts display of image N−1 from time T01 and the displayed image is switched to image N at time T11. Additionally, the n-th line of the display panel 4 of the image display device 5 in the second row starts display of image N−1 from time T11 and the displayed image is switched to image N at time T21.

Furthermore, the first line of the display panel 4 of each image display device 5 in the third row starts display of image N−1 from time T1 and the displayed image is switched to image N at time T2. Additionally, the n-th line of the display panel 4 of the image display device 5 in the third row starts display of image N−1 from time T2 and the displayed image is switched to image N at time T3.

As described above, according to the operation of the image information processing device 1 in the present embodiment, display of each image display device 5 in the first row is started at time T0. That is, for image N−1, the display panel 4 of each image display device 5 located in the first row starts the display of the first line at T0, sequentially advances the relevant drawing within the time length 1V, and completes the drawing of the n-th line at time T1. At this time T1, the display panel 4 of each image display device 5 in the first row completes the image N−1.

In contrast, for image N−1, the display panel 4 of each image display device 5 located in the second row starts the display of the first line at T01 when ½V has just elapsed from time T0 (see FIG. 4A). At this time T01, the display panel 4 of each image display device 5 located in the first row has completed the drawing of only the upper half of image N−1. The display panel 4 of each image display device 5 in the second row sequentially advances the relevant drawing within the time length 1V measured from time T01, and completes the drawing of the n-th line at time T11. In this process in the second row, since the display panel 4 of each image display device 5 located in the first row starts the drawing of the next image N from time T1, the image of the n-th line of the display panel 4 of each image display device 5 in the first row coincides with the image of the first line of the display panel 4 of each image display device 5 in the second row within a time length of ½V from time T1 to time T11.

In addition, for image N−1, the display panel 4 of each image display device 5 located in the third row starts the display of the first line at T1 when 1V has just elapsed from time T0 (see FIG. 4A). At this time T1, the display panel 4 of each image display device 5 located in the first row has completed the drawing of the entire image N−1, and the display panel 4 of each image display device 5 located in the second row has completed the drawing of only the upper half of image N−1. The display panel 4 of each image display device 5 in the third row sequentially advances the relevant drawing within the time length 1V measured from time T1, and completes the drawing of the n-th line at time T2. In this process in the third row, since the display panel 4 of each image display device 5 located in the second row starts the drawing of the next image N from time T11, the image of the n-th line of the display panel 4 of each image display device 5 in the second row coincides with the image of the first line of the display panel 4 of each image display device 5 in the third row within a time length of ½V from time T11 to time T2.

According to the display operation of an image by the image information processing device 1, no delay of one frame or greater is produced between the image displayed by the image display devices 5 located in the first row and the image displayed by the image display devices 5 located in the third row. In addition, the image information processing device 1 can perform the image display while generating a time length ½V during which the same image is displayed at the boundary between the upper and lower adjacent display panels.

Therefore, according to the image information processing device 1 of the present embodiment, no considerable delay is generated in the operation of displaying one image, and it is possible to reduce a display shift produced at the boundary between the display panels.

In order to implement the above operation, the image information storage unit 11 has an memory area capable of storing image information of one frame and further image information of at least one line.

The writing processing unit 10 writes the image information of one frame in the image information storage unit 11 sequentially at every moment, based on the first vertical synchronizing signal. That is, in FIG. 4A, the writing processing unit 10 writes the image information, from image information corresponding to the first line to the image information corresponding to the n-th line, within a time length from time T0 to time T1. In the next time length (from time T1 to time T2), different image information (N) is overwritten on the image information storage unit 11. Accordingly, the writing processing unit 10 overwrites the image information utilized to the drawing of the next image sequentially for each frame, based on the first vertical synchronizing signal.

Here, the start of overwriting of the image information of image N onto the image information of image N−1 starts at time T1. Therefore, in the display panel 4 of each image display device 5 located in the first row, the partial image information for the upper ⅓ of image N−1 is present in the image information storage unit 11 during a time length from time T0 to time T1 (during which this partial image information is to be displayed in the relevant display panel 3) without being overwritten with the next image information (of image N). Accordingly, each image display device 5 located in the first row can advance the drawing operation by using the image information storage unit 11 sequentially at every moment, based on the first vertical synchronizing signal without problems.

Additionally, at time T11, in the upper half of the image information storage unit 11, the partial image information for each image display device 5 located in the second row (i.e., partial image information for the middle ⅓ of image N−1) has already been overwritten with the image information for the next image (i.e., image N). However, at this time (T11), since the display of the present partial image information has completed, the drawing operation can be advanced without problems.

For the partial image information for each image display device 5 located in the third row (i.e., partial image information for the lower ⅓ of image N−1), at time T2 when the n-th line of the display panel 4 should be displayed, the image information corresponding to the bottom line in the image information of image N−1 stored in the image information storage unit 11 is overwritten with the image information of image N. Therefore, in order to display the image information, which corresponds to the bottom line in the image information of image N−1, in the n-th line of each display panel 4 of the third row at time T2, it is necessary to store, in advance, the image information for the n-th line of image N−1, separately in a memory area provided as a reserve. Accordingly, in addition to the memory area utilized to store image information of one frame, the image information storage unit 11 also has a memory area utilized to store at least one line.

Figure 5:
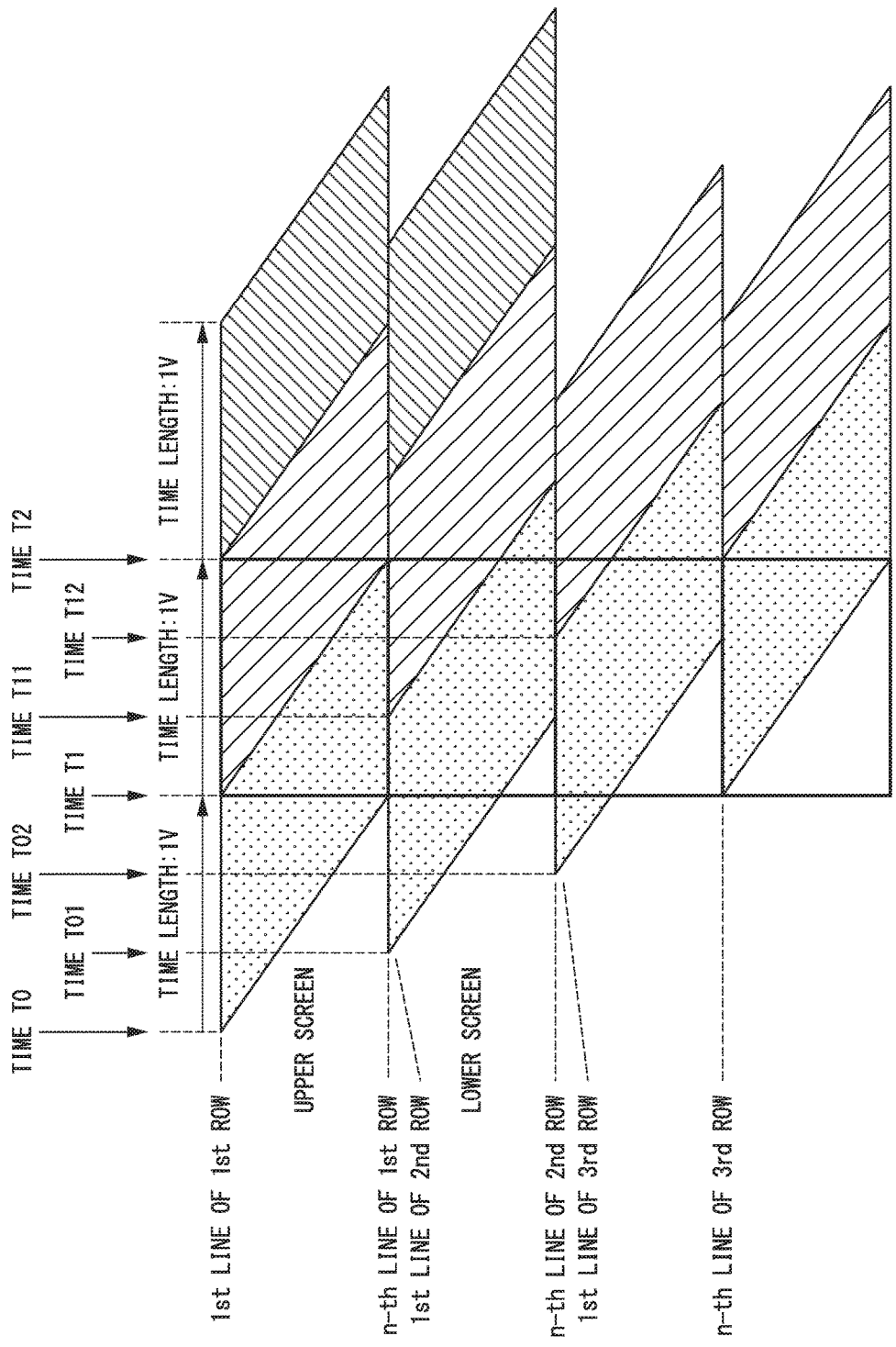
FIG. 5 is a second diagram utilized to explain an effect based on the operation of the image information processing device according to an embodiment of the present invention.
Figure 6B:
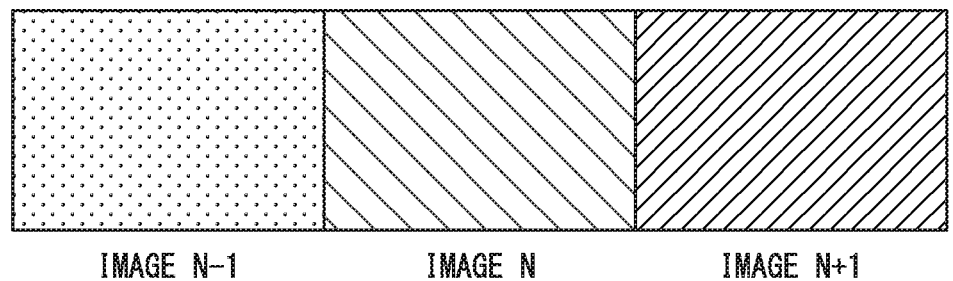
FIG. 6B is a diagram utilized to show an example of displayed images in individual frames.
Figure 7A:
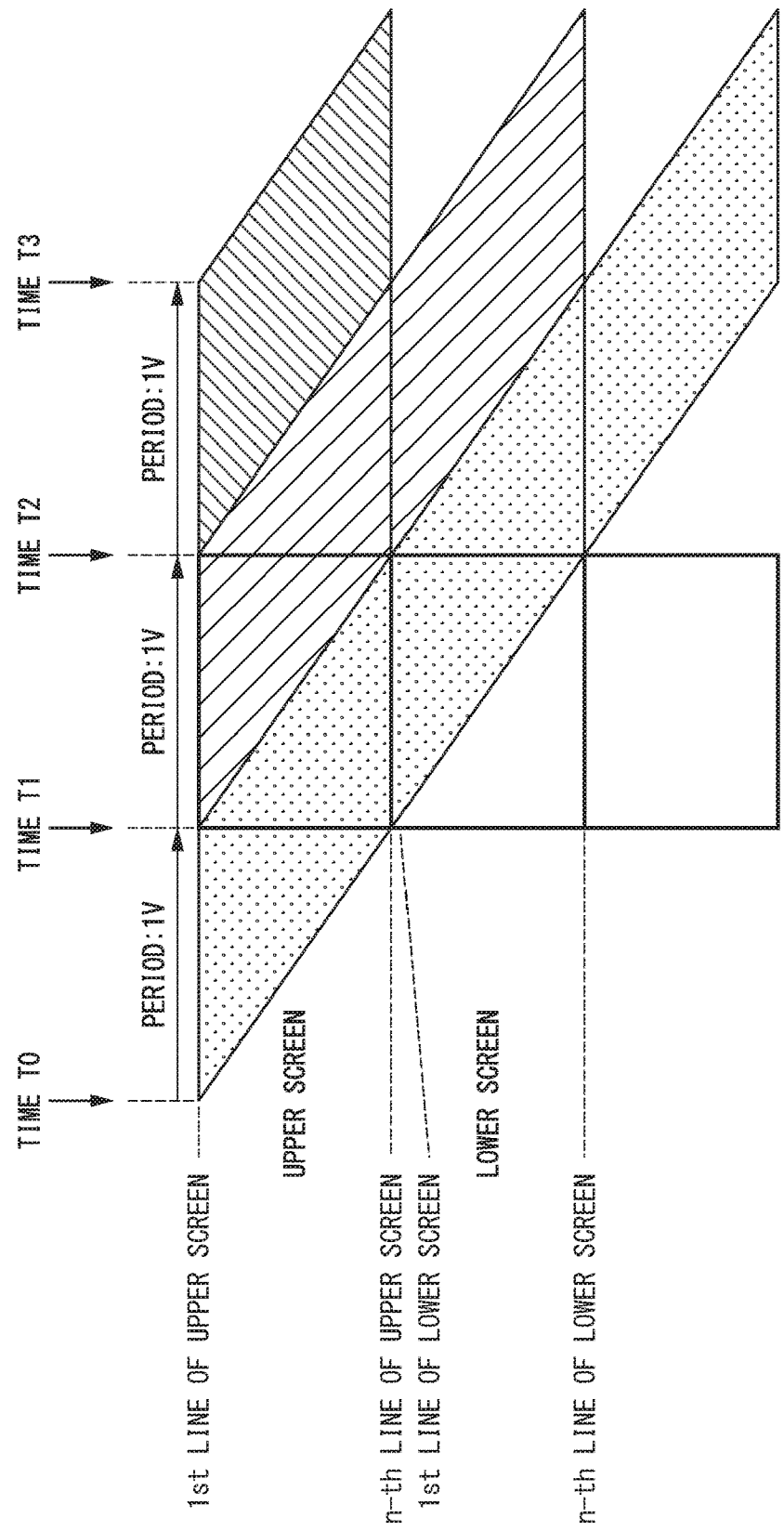
FIG. 7A is a diagram utilized to explain display shift correction means in an image display system related to the present invention.
Figure 7B:
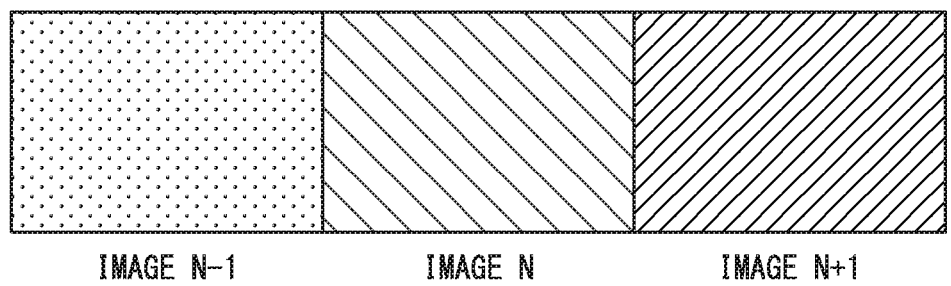
FIG. 7B is a diagram utilized to show an example of displayed images in individual frames.

FIG. 5 is a second diagram utilized to explain an effect based on the operation of the image information processing device according to an embodiment of the present invention. FIG. 5 shows a transition in the display of each image display device 5 in a case in which four image display devices 5 are arrayed vertically (i.e., N=4). When the vertical arrangement number N is 4, according to Formula (1), the reading processing unit 12 of each image display device 5 determines that a delay amount of ⅓V is assigned to the display panels 4 in the second row, a delay amount of ⅔V is assigned to the display panels 4 in the third row, and a delay amount of 1V is assigned to the display panels 4 in the fourth row.

In this case, for image N−1, the display panel 4 of each image display device 5 in the second row starts the drawing of the first line at time T01 when ⅓V has just elapsed from time T0 (see FIG. 5). The display panel 4 of each image display device 5 in the second row sequentially advances the relevant drawing within the time length 1V measured from time T01, and completes the drawing of the n-th line at time T11. In this process, within a time length of ⅓V from time T1 to time T11, the image of the n-th line of the display panel 4 of each image display device 5 in the first row coincides with the image of the first line of the display panel 4 of each image display device 5 in the second row.

Similarly, for image N−1, the display panel 4 of each image display device 5 in the third row starts the drawing of the first line at time T02 when ⅔V has just elapsed from time T0 (see FIG. 5). The display panel 4 of each image display device 5 in the third row sequentially advances the relevant drawing within the time length 1V measured from time T02, and completes the drawing of the n-th line at time T12. In this process, within a time length of ⅓V from time T11 to time T12, the image of the n-th line of the display panel 4 of each image display device 5 in the second row coincides with the image of the first line of the display panel 4 of each image display device 5 in the third row.

For the display panel 4 of each image display device 5 in the third row and the display panel 4 of each image display device 5 in the fourth row, similarly, within a time length of ⅓V from time T12 to time T2, the image of the n-th line of the display panel 4 of each image display device 5 in the third row coincides with the image of the first line of the display panel 4 of each image display device 5 in the fourth row.

As described above, according to the operation of the image information processing device 1, even when the vertical arrangement number N is 4, no delay of one frame or greater is produced between the image displayed by the image display devices 5 located in the first row and the image displayed by the image display devices 5 located in the fourth row. In addition, the image information processing device 1 can perform the image display while generating a time length ⅓V during which the same image is displayed at the boundary between the upper and lower adjacent display panels.

The above-described image display system 100 includes a computer system. The individual steps in the operation of the image display system 100 are stored as a program in a computer-readable storage medium, and the operation is performed when the relevant computer loads and executes the program. The above computer readable storage medium is a magnetic disk, magneto optical disk, CD-ROM, DVD-ROM, semiconductor memory, or the like. In addition, the relevant computer program may be provided to a computer via a communication line, and the computer which received the program may execute the program.

In addition, the image display system 100 according to an embodiment has a mode in which a plurality of image display devices 5, each including the image information processing device 1 and the display panel 4, by which the image information processing device 1 is assigned with each display panel 4. However, this mode is not limited in other embodiments. For example, the image display system 100 may have a form in which a plurality of display panels 4 and one image information processing device 1 are provided. In this case, the relevant image information processing device 1 may have an image information distribution unit that distributes image information items distributed and output to the individual display panels 4.

Additionally, the above embodiments have been shows as examples and it is not intended to limit the scope of the invention. These embodiments are capable of being implemented in other various forms, and various omissions, replacement, or variations can be performed without departing from the scope of the invention. These embodiments and their modifications fall within the scope and concept of the invention and are included in the scope of the invention shown in the claims and its equivalents.

INDUSTRIAL APPLICABILITY

No considerable delay is generated in the operation of displaying one image, and it is possible to reduce a display shift produced at the boundary between the display panels.

REFERENCE SYMBOLS 1 image information processing device
10 writing processing unit
11 image information storage unit
12 reading processing unit
2 information input unit
3 drive unit
4 display panel
5 image display device
100 image display system

The invention claimed is:

1. An image display device having a display panel, the device being utilized to form an image display system in which a plurality of image display devices are arrayed in a vertical direction to display one image as a whole while an image allocated to each device is displayed via the corresponding display panel, the image display device comprising:
a reading processing unit that reads out partial image information of a frame and delays a start of an output of the partial image information by a predetermined period of time from a start of an output of another partial image information of a same frame, the another partial image information being output by another image display device corresponding to a first row of a vertical arrangement, the predetermined period being determined based on a number of the image display devices arrayed in the vertical direction and a row to which the present image display device belongs in the vertical arrangement.

2. The image display device in accordance with claim 1, wherein:
the reading processing unit that delays the start of the output by the predetermined period which is (i−1)/(N−1) frame length based on the number N of the image display devices arrayed in the vertical direction and the i-th row to which the present image display device belongs in the vertical arrangement.

3. The image display device in accordance with claim 2, wherein no delay of one frame or greater is produced between the image displayed by the image display devices located in the first row and the image displayed by the image display devices located in a third row.

4. The image display device in accordance with claim 1, wherein:
for a first vertical synchronizing signal input from an external device, the reading processing unit generates a second vertical synchronizing signal, to which a predetermined amount of delay shift is applied based on the number of the image display devices arrayed in the vertical direction, and outputs the partial image information to the display panel at every moment based on the second vertical synchronizing signal.

5. The image display device in accordance with claim 3, further comprising:
an image information storage unit that has a memory area capable of storing partial image information of one frame and further partial image information of at least one line; and
a writing processing unit that writes the partial image information of one frame in the image information storage unit sequentially at every moment, based on the first vertical synchronizing signal.

6. The image display device in accordance with claim 5, wherein the writing processing unit writes the partial image information, from image information corresponding to a first line to the partial image information corresponding to an n-th line, within a time length from a first time to a second time, and
wherein, in a next time length from the second time to a third time, the third time being after the second time, different partial image information is overwritten on the image information storage unit.

7. The image display device in accordance with claim 6, wherein the writing processing unit overwrites the partial image information utilized to a drawing of a next image sequentially for each frame, based on the first vertical synchronizing signal.

8. The image display device in accordance with claim 1, further comprising:
an image information storage unit that has a memory area capable of storing partial image information of one frame and further partial image information of at least one line.

9. The image display device in accordance with claim 8, wherein the partial image information comprises a region allocated to the image display device in the image information stored in the image information storage unit.

10. The image display device in accordance with claim 1, wherein the number N of the image display devices arrayed in the vertical direction is 3 or more.

11. The image display device in accordance with claim 1, wherein no delay of one frame or greater is produced between the image displayed by the image display devices located in the first row and the image displayed by the image display devices located in a third row.

12. An image display system in which a plurality of image display devices are arrayed in a vertical direction to display one image as a whole while an image allocated to each device is displayed via a corresponding display panel, the image display system comprising:
each of the image display devices has a reading processing unit that reads out partial image information of a frame and delays a start of an output of the partial image information by a predetermined period of time from a start of an output of another partial image information of a same frame, the another partial image information being output by another image display device corresponding to a first row of a vertical arrangement, the predetermined period being determined based on the number of the image display devices arrayed in the vertical direction and a row to which the present image display device belongs in the vertical arrangement.

13. The image display system in accordance with claim 12, wherein the number N of the image display devices arrayed in the vertical direction is 3 or more.

14. An image display method in which a plurality of image display devices are arrayed in a vertical direction to display one image as a whole while an image allocated to each device is displayed via a corresponding display panel, wherein:

a reading processing unit provided in each of the image display devices reads out partial image information of a frame and delays a start of an output of the partial image information by a predetermined period of time from a start of an output of another partial image information of a same frame, the another partial image information being output by another image display device corresponding to a first row of a vertical arrangement, the predetermined period being determined based on the number of the image display devices arrayed in the vertical direction and a row to which the present image display device belongs in the vertical arrangement.

15. The image display method in accordance with claim 14, wherein the number N of the image display devices arrayed in the vertical direction is 3 or more.

* * * * *